(12) United States Patent
Lin et al.

(10) Patent No.: US 7,520,540 B2
(45) Date of Patent: Apr. 21, 2009

(54) COVER LATCH

(75) Inventors: Tzu-Yu Lin, Shulin (TW); Shun-Yu Hung, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 49 days.

(21) Appl. No.: 11/818,601

(22) Filed: Jun. 15, 2007

(65) Prior Publication Data

US 2008/0309097 A1    Dec. 18, 2008

(51) Int. Cl.
*E05C 19/06* (2006.01)
(52) U.S. Cl. ................................. 292/83; 292/169.17
(58) Field of Classification Search ............... 292/83, 292/47, 27, 34, 37, 46, 49, 59, 60, 65, 111, 292/121, 124, 126, 159, 161, 165, 170, 169, 292/302, 169.14, 169.15, 169.17 X, 169.22
See application file for complete search history.

(56) References Cited

U.S. PATENT DOCUMENTS

| | | | | | |
|---|---|---|---|---|---|
| 3,819,282 | A | * | 6/1974 | Schultz | 401/105 |
| 5,882,053 | A | * | 3/1999 | Bekins et al. | 292/336.3 |
| 6,059,326 | A | * | 5/2000 | Tramontina | 292/169 |
| 6,115,239 | A | * | 9/2000 | Kim | 361/681 |
| 6,120,069 | A | * | 9/2000 | Taranto | 292/35 |
| 6,535,380 | B1 | * | 3/2003 | Lee et al. | 361/683 |
| 6,669,243 | B2 | * | 12/2003 | Katoh et al. | 292/34 |

* cited by examiner

*Primary Examiner*—Patricia Engle
*Assistant Examiner*—Mark Williams
(74) *Attorney, Agent, or Firm*—William E. Pelton, Esq.; Cooper & Dunham LLP

(57) ABSTRACT

The present invention relates to a cover latch for an electronic device and includes a body, a latch bar, an actuator and a driver. The driver is connected to the cover body, the actuator and the latch bar. Only one hand is required to unlatch the cover latch by rotating the actuator and the driver that moves the latch bar.

5 Claims, 4 Drawing Sheets

COVER LATCH

BACKGROUND OF THE INVENTION

1. Field of the Invention

The present invention relates to a cover latch, especially to a cover latch to allow one-handed operation to unlatch a cover from a base of an electronic device.

2. Description of the Related Art

Conventional electronic devices, for example laptops, cell phones and PDAs, usually comprise a base, a cover, an electronic mechanism, multiple keys, a monitor, a hinge and a latch. The base has a proximal edge, a distal edge and two latch holes. The cover is connected pivotally to the base and has a proximal edge and a distal edge. The electronic mechanism and most of the keys are mounted in the base. The monitor is mounted on the cover. The hinge is connected to the two proximal edges to allow the cover to pivot relative to the base. The latch is usually mounted in the distal end of the cover to securely hold the cover closed and usually has two latch assemblies, and each latch assembly has an actuating tab. The actuating tabs protrude from the distal edges of cover and respectively engage the holes in the base.

The latch makes locking or unlocking the electronic device convenient. However, operation of the latch tends to be a two-handed operation, which can be inconvenient.

SUMMARY OF THE INVENTION

The objective of the present invention is to provide a cover latch for an electronic device, which can be operated with one hand.

The cover latch in accordance with the present invention comprises a cover body, a latch bar, an actuator and a driver. The cover body has a proximal edge and a distal edge. The latch bar is mounted slidably inside the cover body close to the distal edge and has two ends and two latches. The latches are formed respectively near the ends. The actuator is mounted rotatably at the distal edge of the cover body. The driver is connected to the cover body, the latch bar and the actuator and has a shaft, a slide and a rotator. The shaft is mounted on the cover body. The slide is mounted slidably on the shaft and securely on the latch bar. The rotator is mounted on and is rotated by the actuator and engages and moves the slide along the shaft to drive the latch bar and unlatch the latches when the actuator is rotated.

The cover latch is operated with one hand.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
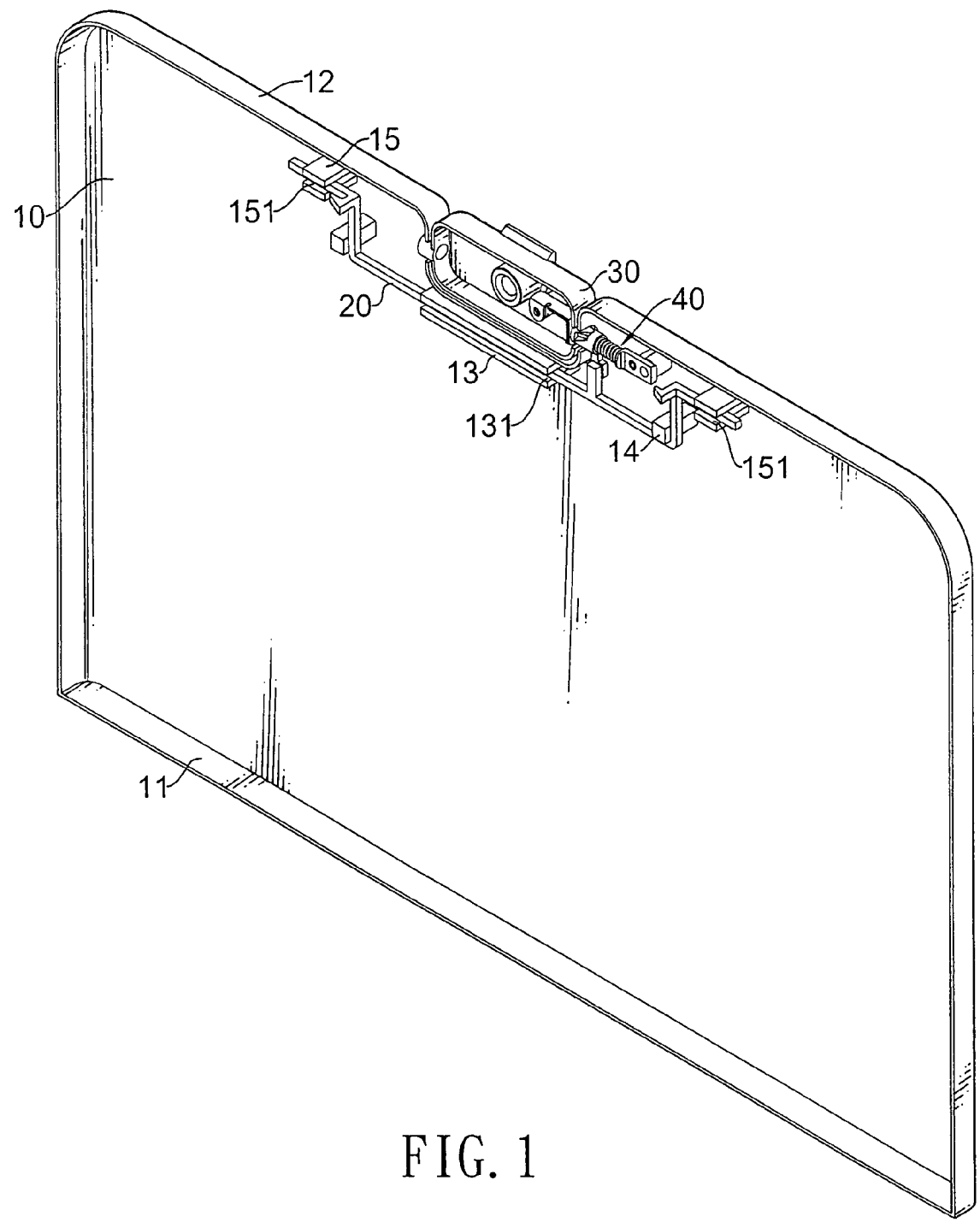
FIG. 1 is a perspective view of a cover latch in accordance with the present invention.

With reference to FIG. 1, a cover latch in accordance with the present invention is mounted in a cover of an electronic device, which attaches pivotally to a base of an electronic device having a proximal edge and a distal edge, and comprises a cover body (10), a latch bar (20), an actuator (30) and a driver (40).

The cover body (10) is a tray-like structure, may hold a display for the electronic device, has an inner surface, a proximal edge (11) and a distal edge (12) and may have a central bracket (13), two limits (14) and two outer brackets (15). The proximal edge (11) may be attached pivotally to the proximal edge of the base.

The central bracket (13) is formed on and protrudes from the inner surface of the body (10) close and parallel to the distal edge (12) and has two ends and a longitudinal slot (131).

The limits (14) are formed on and protrude from the inner surface respectively outside the two ends of the central bracket (13).

The outer brackets (15) are formed on and protrude from the inner surface of the body (10) adjacent to the distal edge (12) respectively outside the limits (14). Each outer bracket (15) has a longitudinal slot (151) parallel to the longitudinal slot (131) in the central bracket (13), and the longitudinal slots (151) of the outer brackets are aligned with each other.

Figure 2:
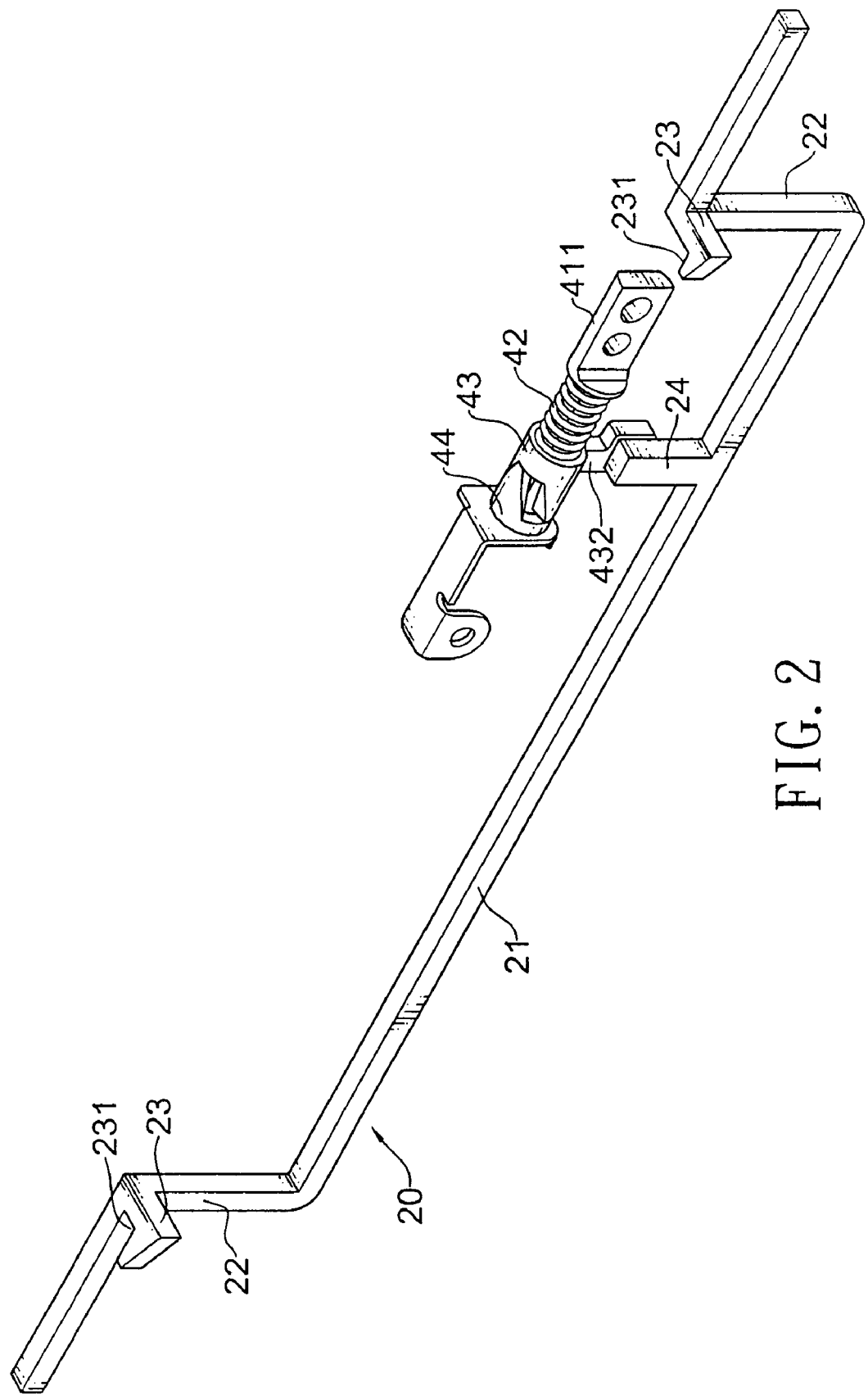
FIG. 2 is an enlarged perspective view of a latch bar, an actuator and a driver of the cover latch in FIG. 1.

With further reference to FIG. 2, a latch bar (20) may be U-shaped, is mounted slidably on and parallel to the inner surface of the body (10) near the distal edge (12) of the cover body (10) in the central bracket (13) and the outer brackets (15), may have a main bar (21) and two end bars (22) and has two ends, two latches (23) and a connecting tab (24).

The main bar (21) is mounted slidably in the longitudinal slot (131) in the central bracket (13), protrudes from the two ends of the central bracket (13) and has two ends.

The two end bars (22) are L-shaped, are formed respectively on and extend transversely from the ends of the main bar (21) parallel to each other, extend longitudinally opposite to each other and are mounted slidably respectively in the longitudinal slots (151) of the outer brackets (15). Each end bar (22) has a transverse leg, a longitudinal leg and a perpendicular junction. The longitudinal legs align with and extend away from each other parallel to the main bar (21) and are mounted slidably respectively in the longitudinal slots (151) of the outer brackets (15), and each longitudinal leg has a distal end.

The latches (23) are formed on and protrude from the latch bar (20) away from the inner surface of the cover body (10) respectively near the ends and may be formed on and protrude respectively from the perpendicular junctions of the end bars (22), and each latch (23) has a neck and a lip (231). The neck is formed on and protrudes from the latch bar (20), protrudes from the perpendicular junction of the end bar (22) and has a distal end. The lip (231) is formed on and protrudes transversely from the distal end of the neck parallel to the latch bar (20) and toward one end of the latch bar (20). The lips (231) extend toward the same end.

The connecting tab (24) is formed on and protrudes transversely from the latch bar (20) or the main bar (21) toward the distal edge (12) of the cover body (10) and has a distal end.

The actuator (30) is mounted rotatably in the distal edge (12) of the body (10) between the two ends of the latch bar (20) and the two outer brackets (15) and may have a web camera. The web camera is mounted in the actuator (30)

Figure 3:
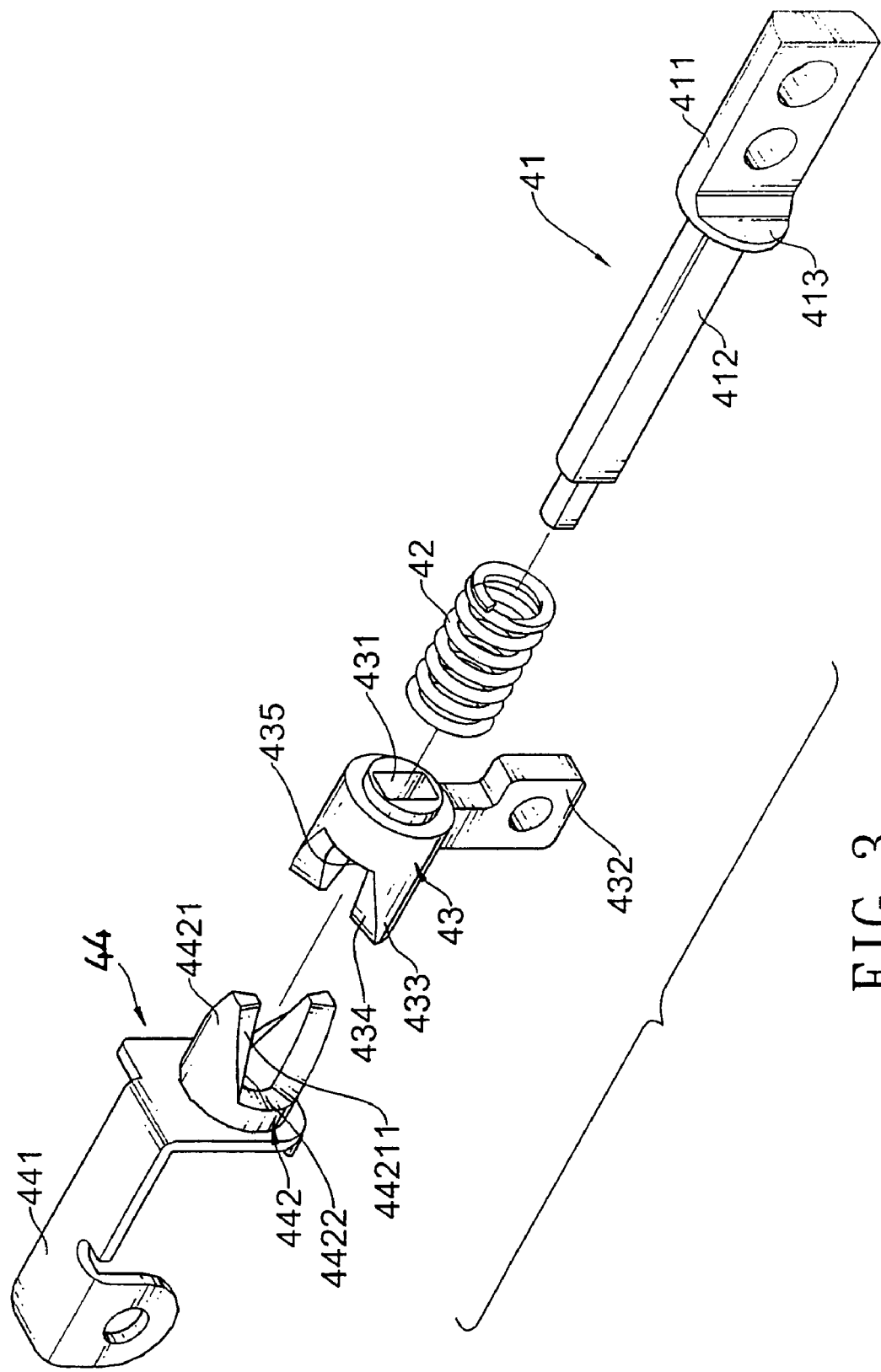
FIG. 3 is an enlarged exploded perspective view of the actuator and the driver in FIG. 2.
Figure 4:
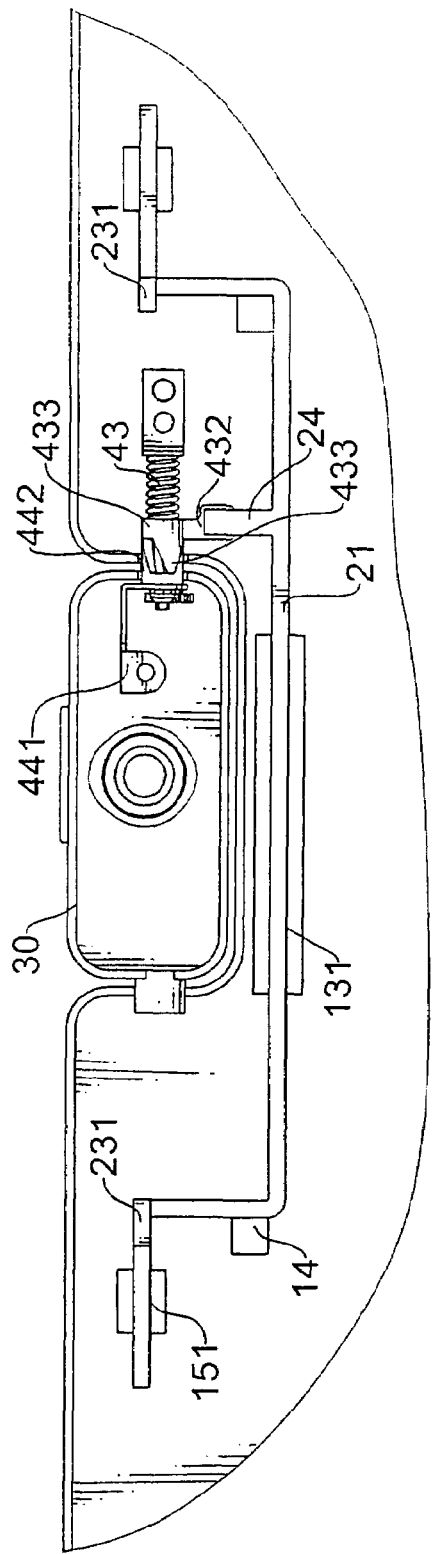
FIG. 4 is an enlarged operational front view of the cover latch in FIG. 1 with the cover latch in a latched position.

With further reference to FIG. 3, the driver (40) is connected to the body (10), the latch bar (20) and the actuator (30) and has a shaft (41), a slide (43), a spring (42) and a rotator (44).

The shaft (41) is connected to the inner surface of the cover body (10) coaxially with the actuator (30) and has a proximal end, a distal end, a leaf (411), a keyed shaft (412) and a flange (413). The leaf (411) is formed on and protrudes longitudinally from the proximal end of the shaft (41) and connects securely to the inner surface of the cover body (10) between one of the outer brackets (15) and the actuator (30). The keyed shaft (412) is formed on and protrudes longitudinally from the distal end of the shaft (41). The flange (413) is formed on and protrudes radially out from the shaft (41) between the leaf (411) and the keyed shaft (412).

The slide (43) is mounted slidably on the keyed shaft (412), is connected to the latch bar (20) and has a coaxial keyhole (431), an outer surface, a proximal end, a connecting arm (432) and a distal end. The coaxial keyhole (431) is formed coaxially through the slide (43) and corresponds to and is mounted slidably on the keyed shaft (412). The connecting arm (432) is formed on and protrudes transversely from the outer surface of the slide (43) away from the distal edge (12) of the cover body (10) and connects to the distal end of the connecting tab (24) of the latch bar (20). The distal end of the slide (43) has two elongated protrusions (433) and two optional flat surfaces (435). The elongated protrusions (433) are formed on and protrude longitudinally from the distal end of the slide (43) opposite to each other, and each elongated protrusion (433) has two inclined edges (434) and a flat distal surface. The flat surfaces (435) are formed on the distal end of the slide (43) between the two elongated protrusions (433), and each flat surface (435) is slightly larger than the flat distal surface of the elongated protrusion (433).

The spring (42) is mounted around the keyed shaft (412) between the flange (413) and the slide (43) and presses the slide (43) toward the distal end of the keyed shaft (412).

Figure 5:
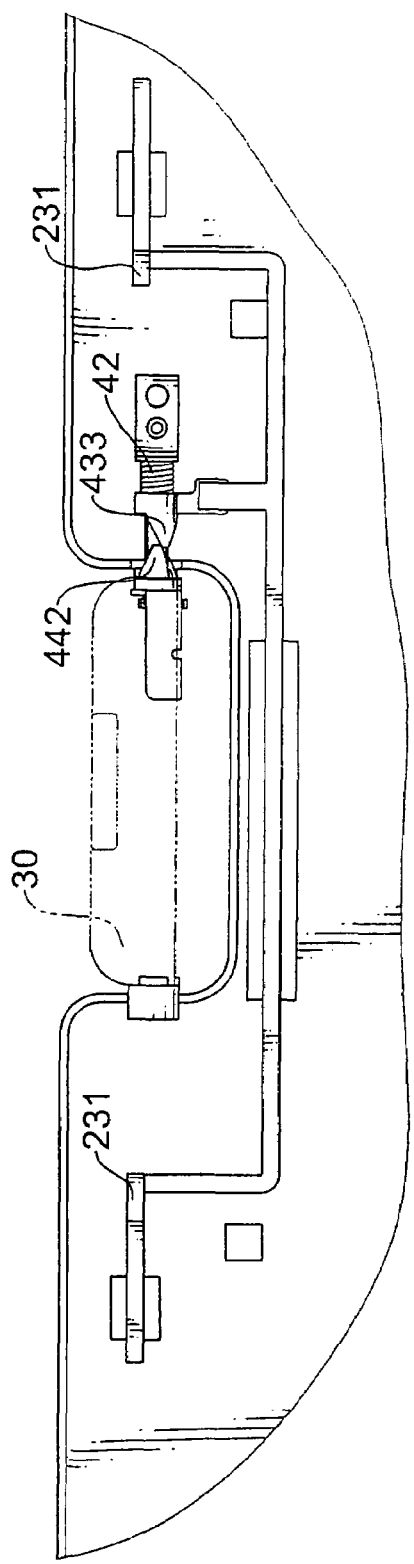
FIG. 5 is an enlarged operational front view of the cover latch in FIG. 1 with the cover latch in an unlatched position.

The rotator (44) is mounted on and is rotated by the actuator (30), engages and moves the slide (43) along the shaft (41) to drive the latch bar (20) and unlatch the latches when the actuator (30) is rotated and has a mounting bracket (441) and a head (442). The mounting bracket (441) is attached to and rotates with the actuator (30) and has a proximal end and a distal end. The proximal end is attached to the actuator (30). The head (442) is attached to and protrudes longitudinally from the distal end of the mounting bracket (441), engages and pushes the slide (43) against the spring (42) along the keyed shaft (412) when the actuator (30) rotates and has a distal end. The distal end of the head (442) has two elongated protrusions (4421) and two optional flat surfaces (4422). The elongated protrusions (4421) are formed on and protrude longitudinally from the distal end of the head (442) opposite to each other, and each elongated protrusion (4421) has two inclined edges (44211) and a flat distal surface. With further reference to FIGS. 5 and 6, one of the inclined edges (44211) on each elongated protrusion (4421) on the head (442) engages and presses against the corresponding inclined edge (434) on the slide (43) to push the slide (43) against the spring (42) along the keyed shaft (412). The flat distal surfaces of the elongated protrusions (4421) on the head are the same as the flat distal surfaces on the elongated protrusions (433) on the slide (43). The flat surfaces (4422) on the distal end of the head (442) are formed between the elongated protrusions (4421) opposite to each other and are slightly larger than the flat distal surfaces of the elongated protrusions (4421) to allow the head (442) and the actuator (30) to pivot some without pressing the slide (43). This allows a web camera mounted in the actuator (30) to be adjusted slightly.

The cover latch as described allows the cover of the electronic device to be unlatched from the of the electronic device base with one hand.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cover latch comprising
 a cover body having
  an inner surface;
  a proximal edge; and
  a distal edge;
 a latch bar being mounted slidably on and parallel to the inner surface of the body near the distal edge of the cover body and having
  two ends; and
  two latches being formed on and protruding from the latch bar away from the inner surface of the cover body, each latch being formed at one of the ends of the latch bar;
 an actuator being mounted rotatably in the distal edge of the body between the two ends of the latch bar; and
 a driver being connected to the body, the latch bar and the actuator, such that the driver being rotated by the actuator when the actuator is rotated and thereby driving the latch bar to slide, the driver having
  a shaft connected to the inner surface of the cover body coaxially with the actuator and having
   a proximal end;
   a distal end;
   a leaf formed on and protruding longitudinally from the proximal end of the shaft and connected securely to the inner surface of the cover body;
   a keyed shaft formed on and protruding longitudinally from the distal end of the shaft; and
   a flange formed on and protruding radially out from the shaft between the leaf and the keyed shaft;
  a slide mounted slidably on the keyed shaft, being connected to the latch bar and having
   a coaxial keyhole formed coaxially through the slide and corresponding to and being mounted slidably on the keyed shaft;
   an outer surface;
   a proximal end; and
   a distal end having two elongated protrusions formed on and protruding longitudinally from the distal end of the slide opposite to each other, each elongated protrusion having
    two inclined edges; and
    a flat distal surface;
  a spring mounted around the keyed shaft between the flange and the slide and pressing the slide toward the distal end of the keyed shaft; and
  a rotator being mounted on and being rotated by the actuator, engaging and moving the slide along the shaft and having
   a mounting bracket attached to and rotating with the actuator and having
    a proximal end attached to the actuator; and a distal end; and a head being attached to and protruding longitudinally from the distal end of the mounting bracket, engaging and pushing the slide against the spring along the keyed shaft and having a distal end having two elongated protrusions formed on and protruding longitudinally from the distal end of the head opposite to each other, each elongated protrusion having two inclined edges, one of the inclined edges on each elongated protrusion on the head engaging and pressing against the corresponding inclined edge on the slide; and a flat distal surface, the flat distal surfaces being the same as the flat distal surfaces on the elongated protrusions on the slide.

2. The cover latch as claimed in claim 1, wherein the distal end of the slide further has two flat surfaces being formed on the distal end of the slide between the elongated protrusions opposite to each other, and each flat surface being larger than the flat distal surface of the elongated protrusion;

the distal end of the head further has two flat surfaces being formed between the elongated protrusions opposite to each other and being larger than the flat distal surfaces of the elongated protrusions.

3. The cover latch as claimed in claim 2, wherein the actuator has a web camera mounted in the actuator.

4. The cover latch as claimed in claim 1, wherein the latch bar is U-shaped and further has a main bar having two ends; and two end bars being L-shaped and being formed respectively on and extending transversely from the ends of the main bar parallel to each other and extend longitudinally opposite to each other; and each end bar has a transverse leg;

a longitudinal leg aligning with and extending away from each other parallel to the main bar and having a distal end; and a perpendicular junction;

a connecting tab being formed on and protruding transversely from the main bar toward the distal edge of the cover body and having a distal end;

the latches are formed on and protrude respectively from the perpendicular junctions, and each latch has a neck being formed on and protruding from the latch bar and having a distal end; and a lip being formed on and protruding transversely from the distal end of the neck parallel to the latch bar and toward one end of the latch bar, the lips extending toward the same end; and the slide of the driver has a connecting arm being formed on and protruding transversely from the outer surface of the slide away from the distal edge of the cover body and connecting to the distal end of the connecting tab of the latch bar.

5. The cover latch as claimed in claim 4, wherein the cover body further has a central bracket being formed on and protruding from the inner surface of the body close and parallel to the distal edge and having two ends; and a longitudinal slot;

two limits being formed on and protruding from the inner surface respectively outside the two ends of the central bracket;

two outer brackets being formed on and protruding from the inner surface of the body adjacent to the distal edge respectively outside the limits, each outer bracket having a longitudinal slot parallel to the longitudinal slot in the central bracket, and the longitudinal slots of the outer brackets being aligned with each other;

the main bar is mounted slidably in the longitudinal slot in the central bracket and protrudes from the two ends of the central bracket;

the end bars are mounted slidably respectively in the longitudinal slots of the outer brackets;

the actuator is mounted between the two outer brackets; and the leaf connects securely to the inner surface of the cover body between one of the outer bracket and the actuator.

* * * * *